US008948599B2

(12) United States Patent
Agrawal et al.

(10) Patent No.: US 8,948,599 B2
(45) Date of Patent: Feb. 3, 2015

(54) FEMTOCELL-BASED MESH NETWORK WITH OPTICAL INTERCONNECT FOR 4-G MULTIMEDIA COMMUNICATIONS

(75) Inventors: Dharma P. Agrawal, Cincinnati, OH (US); Nishan S. Weragama, Cincinnati, OH (US); Hailong Li, Cincinnati, OH (US)

(73) Assignee: Dharma P. Agrawal, Cincinnati, OH (US)

( * ) Notice: Subject to any disclaimer, the term of this patent is extended or adjusted under 35 U.S.C. 154(b) by 1109 days.

(21) Appl. No.: 12/951,973

(22) Filed: Nov. 22, 2010

(65) Prior Publication Data

US 2012/0027409 A1 Feb. 2, 2012

Related U.S. Application Data

(60) Provisional application No. 61/368,279, filed on Jul. 28, 2010.

(51) Int. Cl.
*H04B 10/00* (2013.01)
*H04B 10/112* (2013.01)
*H04B 10/114* (2013.01)

(52) U.S. Cl.
CPC ........ *H04B 10/1129* (2013.01); *H04B 10/1149* (2013.01)
USPC ........... 398/118; 398/127; 398/128; 398/130; 398/172; 398/115; 398/58; 370/328; 370/329; 370/235

(58) Field of Classification Search
CPC .. H04B 10/11; H04B 10/112; H04B 10/1121; H04B 10/1123; H04B 10/1129; H04B 10/114; H04B 10/1141; H04B 10/1143; H04B 10/1149; H04B 10/118; H04B 10/116
USPC ........... 398/118, 172, 115, 128, 130, 58, 126, 398/127, 129, 131, 119; 370/328, 329, 235, 370/352
See application file for complete search history.

(56) References Cited

U.S. PATENT DOCUMENTS

| 6,842,439 B2 * | 1/2005 | Zeitfuss ................. 370/328 |
| 7,215,887 B2 * | 5/2007 | Ternullo et al. .......... 398/118 |
| 8,503,886 B1 * | 8/2013 | Gunasekara et al. ....... 398/172 |
| 2003/0020992 A1 * | 1/2003 | Child .................... 359/172 |
| 2008/0304831 A1 * | 12/2008 | Miller et al. ............ 398/115 |
| 2009/0252088 A1 | 10/2009 | Rao et al. |

OTHER PUBLICATIONS

Vikram Chandrasekhar, Jeffrey G. Andrews, and Alan Gatherer, "Femtocell Networks: A Survey" IEEE Transactions on Wireless Communications, vol. 8, Issue 8, pp. 4316-4328, 2009.
Bing He, Bin Xie, and Dharma P. Agrawal, "Optimizing the Internet Gateway Deployment in a Wireless Mesh Network" Proc. Mobile Ad hoc and Sensor Systems, 2007(MASS 2007), IEEE International Conference.

* cited by examiner

*Primary Examiner* — Hanh Phan
(74) *Attorney, Agent, or Firm* — Scientific Works, LLC; Yue Ma

(57) ABSTRACT

A network architecture for integrating a 4G wireless mesh network (WMN) with a 3-G network in order to effectively support multimedia communication is described. In one embodiment of the present invention, a wireless mesh network system comprises a plurality of routers each having a wireless optical interface; at least one base station having Internet backhaul and connecting to a wireless optical device; a computer media storing instructions for assigning at least one of the plurality of routers to act as an Internet gateway via said base station; wherein said assigned router and said base station communicating via a link between wireless optical interface of said assigned router and the wireless optical device connected to said base station, and said link is line-of-sight.

18 Claims, 9 Drawing Sheets

FEMTOCELL-BASED MESH NETWORK WITH OPTICAL INTERCONNECT FOR 4-G MULTIMEDIA COMMUNICATIONS

CROSS-REFERENCE TO RELATED APPLICATIONS

This application claims the benefit of U.S. Provisional Application Ser. No. 61/368,279, filed on Jul. 28, 2010. The disclosure of the above application is incorporated herein by reference in its entirety for any purpose.

FIELD OF THE INVENTION

The present invention generally relates to 4G multimedia access using wireless mesh network technology, and particularly relates to supporting wireless mesh network using existing Femtocell used for indoor enhancements in existing 3G network.

BACKGROUND OF THE INVENTION

A Wireless Mesh Network (WMN) consists of wireless Mesh Routers (MRs) and Internet Gateways (IGWs) forming a multi-hop backbone network aiming to support end users. MRs are connected to IGWs in a multi-hop manner and IGWs connect the wireless backbone with the Internet. The capacity of the mesh network plays a crucial role in determining the number of clients the mesh network can support acceptable Quality of Service for multimedia data transfer. The capacity of the mesh network has been a limiting factor in its wider acceptance for such 4-G applications.

The issue of capacity is reflected when analyzing multimedia frames over mesh networks. The number of multimedia calls that can be placed in a mesh network drops significantly with an increase in the number of hops. The number of calls that can be supported becomes almost zero after a certain number of hops. Over the years, there have been numerous schemes and techniques proposed to increase the capacity of mesh networks that could support additional multimedia calls without increasing the number of IGWs as adding IGWs increases the overall cost. But, almost all of these schemes are inadequate in significantly improving the number of calls that can be placed on the network so as to attract attention of the general public for a wider acceptance.

The most common way to increase the capacity of a WMN that could support more multimedia calls is to deploy more IGWs. This definitely adds more bandwidth to the system as it decreases the number of hops for a multimedia call to reach a gateway. But, adding more IGWs further increases the cost of the network, making it prohibitively expensive and unattractive for a large scale deployment.

SUMMARY OF THE INVENTION

According to the present invention, a system for working with a wireless mesh network combines scattered Femtocells with mesh networks, allowing some of the MRs to route packets to nearby selected Femtocells as IGWs such that the capacity of the WMN could be enhanced with minimal increase in the cost.

According to one feature of the present invention, via an optical link, a mesh router can be connected to the nearest 3-G Femtocell base station, which has an Internet backhaul and acts as a new additional Internet gateway. The traffic generated from the neighbors of such mesh router can be forwarded to and from the mesh router via the mesh-optical link-Femtocell system, instead of going far away up to the original gateway.

According to another feature of the present invention, various connection schemes for Femtocell-optical device can be used. In one scheme, a 3-G Femtocell base station with integrated optical interface is used. The mesh router also has an integrated optical interface in order to communicate with a 3-G Femtocell base station via line-of-sight optical link. In another scheme, an external optical device acts as a bridge to mesh router in the mesh network. Such optical device is connected to a 3-G Femtocell base station via one of multiple interfaces. In a similar manner, the mesh router also has an integrated optical interface in order to communicate with the optical device, connected to the 3-G Femtocell base station, via line-of-sight. Yet in another scheme, if the direct connection between 3-G fermtocell and optical device is not feasible, a computer aided optical device can be used. The computer aided optical device communicates with a mesh router with integrated optical interface via line-of-sight, whereas it can communicate with a Femtocell via an indoor local wireless radio frequency link. Such computer aided optical device acts as a bridge between Femtocell base station and optical transceiver placed outside the house.

According to another feature of the present invention, various deployment strategies can be used to select a mesh router to act as a bridge to the Internet via connecting to either a traditional Internet gateway or a 3-G Femtocell base station, whereas a tradeoff between maximum network bandwidth and low cost can be achieved. One strategy is location based, in which a heuristic algorithm is run blindly without discriminating between 3-G Femtocell base station and Internet gateway, to select candidate MRs to serve as additional Internet gateway; then to select what each candidate MR is connected based on the location of the nearest Femtocell or Internet gateway.

The present invention is advantageous over previous systems such that the optical connection to 3-G Femtocell is used to reduce the number of hops a mesh router needs to reach an Internet gateway, thus increase the bandwidth of the mesh network.

Further, the advantage of the present invention includes the use of optical devices providing both high network bandwidth (speed of line-of-sight infrared laser beam is within the range of speed of light and weather does not have any impact on error rate) and low cost in hardware devices.

Further, the advantage of the present invention includes the guaranteed QoS for multimedia data services such as VoIP calls or video frames.

Other aspects, advantages, and salient features of the invention will become apparent to those skilled in the art from the following specification and the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

When a user wants to access an Internet related multimedia application, if the functionality of the application depends on the underlying network from user's perspective, he/she would obviously like to be connected to an underlying network that could meet the requirements of the application. If there is a choice of selecting which network to be used, preference would be given to the network that can satisfy the data transfer requirements at a lower cost.

Based on predictions and speculations of various vendors and organizations, a wider deployment of 3-G Femtocells seems to be imminent in the near future. By integrating these 3-G Femtocells as a type of additional Internet Gateways to a mesh network, we can utilize available bandwidth on these Femtocells and increase the capacity of the mesh network. This kind of a network will cover a large area, providing multimedia access to a larger number of users at a lower price. Also, by making sure that the users will not experience any major differences in QoS on a WMN as compared to what the user experiences on some other network, more users and organizations would be willing to deploy and accept 4-G WMNs.

Wireless Mesh Network

Figure 1:
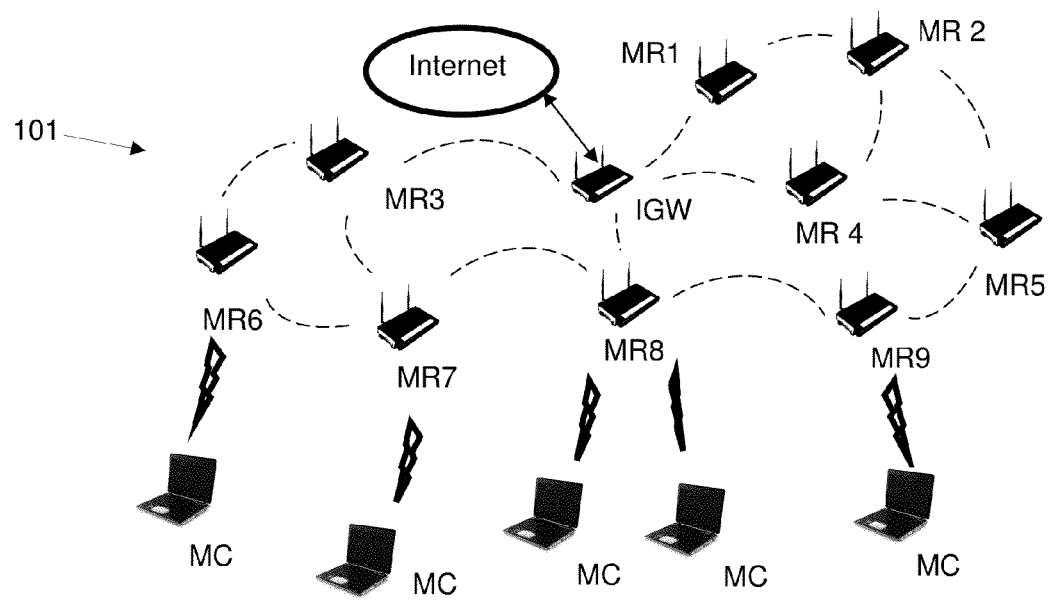
FIG. 1 is an exemplary illustration of Wireless Mesh Network.

A wireless mesh network (WMN) is a multi-hop mesh topology communications network. With reference to FIG. 1, a WMN (101) often comprises mesh clients (MCs), mesh routers (MRs) and Internet gateways (IGWs). The mesh clients (MCs) are often wireless user equipments. Mesh routers (MRs) are wireless routers, which provide coverage to mesh clients (MCs) and communicate with IGW. IGWs are some special mesh routers with Internet accessibility.

Femtocells

Figure 2:
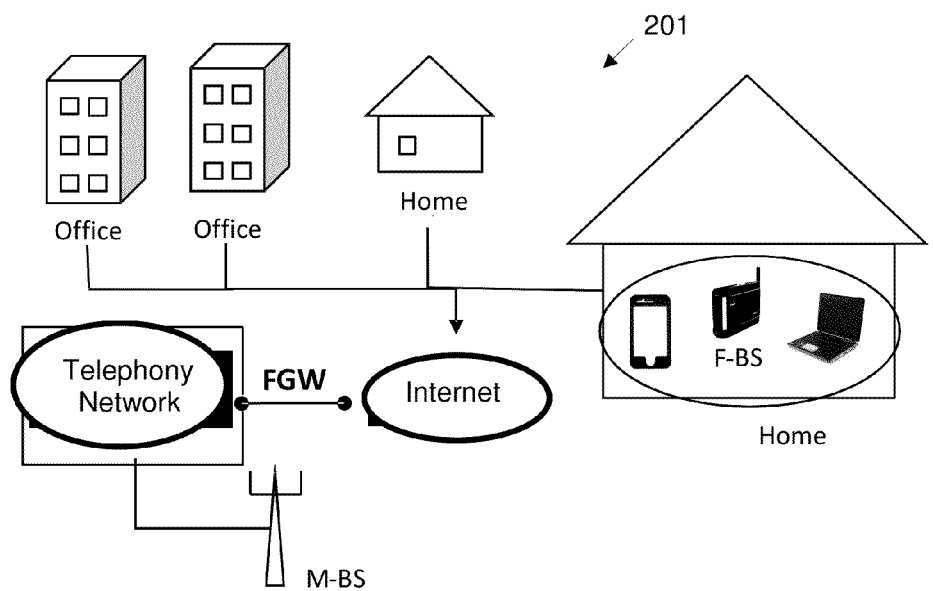
FIG. 2 shows a typical Femtocell Network.

A Femtocell is a small-size 3-G cellular network, designed for better indoor coverage and capacity. With reference to FIG. 2, a Femtocell network (201) comprises of three components: Femtocell Base Stations (F-BSs), Internet Link and Femtocell Gateway (FGW). F-BSs, installed by end users in home or office environment, connect small number of wireless users with the Internet via Internet Link. FGWs are bridge components between the Internet and the core telephony network. The present invention can be applied to any type of 3-G Femtocell. However, for simplicity, the Femtocells we use are referring to the ones with Open Access capabilities which have higher bandwidth and hereafter we will plainly refer to them as Femtocells or Femto Base Stations.

Recently, the concept of 3-G Femtocells has been introduced as an effective way of increasing indoor capacity of a 3-G cellular network. Further reading is provided in the article by Vikram Chandrasekhar, Jeffrey G. Andrews, and Alan Gatherer, "Femtocell Networks: A Survey" IEEE Transactions on Wireless Communications, volume 8, Issue 8, pp. 4316-4328, 2009. Small price and low power deployment have been the key factors for its popularity.

Optical Wireless System

An optical wireless system, also known as free space optics system, is a point-to-point communication system using infrared wave as carrier. Optical wireless system has several advantages over radio frequency wireless system. An optical wireless product can transmit multimedia data at bandwidths up to 1.25 Gbps. Optical wireless technology does not require expensive radio frequency spectrum licensing. Security issue and radio frequency interference are not issues in optical wireless system. Optical wireless product can even be deployed behind windows, saving costs for rooftop rental fee and device maintenance fee. Optical wireless systems often include optical transmitter and optical receiver. Optical transmitter often includes optical source and lens. And optical receiver has a receiving lens and high-sensitivity board, which are connected together via optical fiber. Transmitter and receiver can be integrated into one optical transceiver to communicate with another transceiver in a duplex mode. Optical wireless link could provide substantial large throughput, however, the basic requirement for using optical wireless communication is Line-of-sight (LOS) between two ends of transmitter-receiver pair and weather is an important factor for optical wireless link. Further readings on optical wireless can found in Free space optics website http://www-.freespaceoptics.org/freespaceoptics/default.cfm.

Designing Mesh-Optical-Femtocell System

Figure 3:
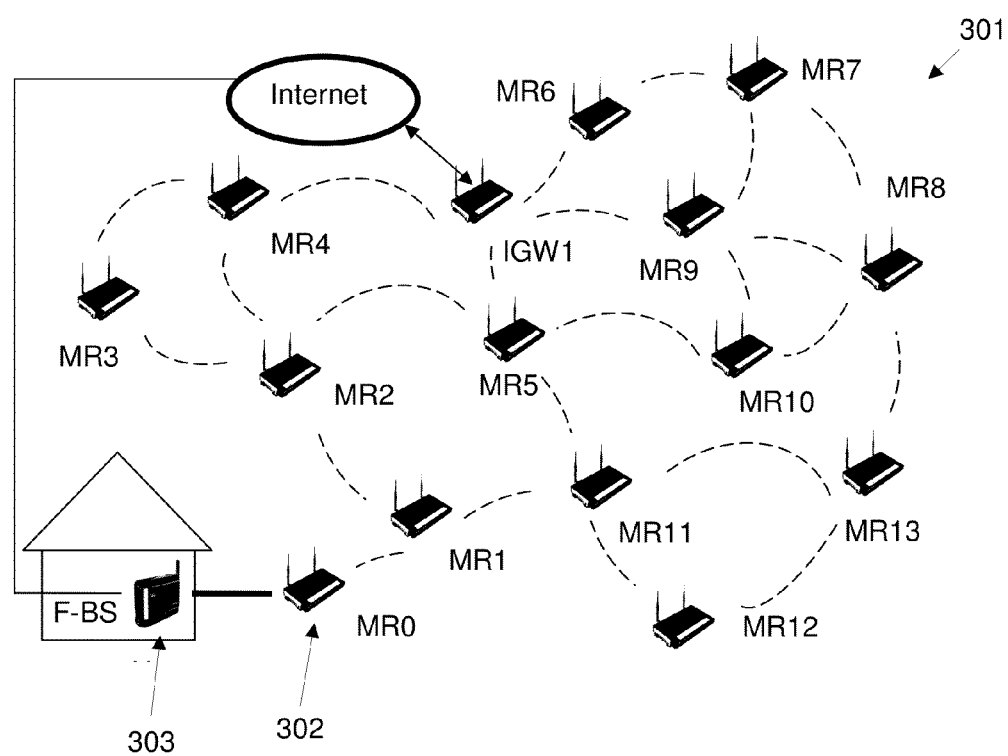
FIG. 3 is an exemplary Mesh-Optical Interconnect-Femtocell System according to one aspect of the present invention.

To increase the capacity of mesh network and reduce the number of hops between mesh routers and IGWs, in one embodiment of the present invention, a Mesh-Optical link-Femtocell system is deployed. The optical wireless system works as a bridge between the mesh router and the Femtocell base station (F-BS). FIG. 3 illustrates the concept of mesh-optical-Femtocell system.

Assume that a WMN (301) is deployed as in the FIG. 3. The mesh router is already connected to a wired Internet, making it work as an IGW. The mesh router (302) is 3-hops away from gateway IGW1 and its performance is poor due to limitations of multi-hop message forwarding. According to one aspect of the present invention, the mesh router (302) can be connected to the nearest Femtocell base station (303) using an optical wireless transceiver and works as an additional Internet gateway, therefore, the throughput of network can be improved. The traffic generated from the neighbors of mesh router (302) can be forwarded to and from the mesh router (302) via mesh-optical link-Femtocell system, instead of going far way up to the original gateway IGW1. Also, the cost of using optical device is much lower than simply making an additional IGW. At the same time, the bandwidth of 3-G Femtocell base station's backhaul can be utilized more efficiently.

Femtocell-Optical

In relation to the WMN with mesh-optical-Femtocell system deployed (as shown in FIG. 3), various connection schemes for Femtocell-optical device can be used. According to one aspect of the present invention, with reference to Scheme One in FIG. 4, a 3-G Femtocell base station F-BS (401) with integrated optical interface is used. The mesh router (402) is required to have an integrated optical interface in order to communicate with the F-BS via line-of-sight (LOS) optical link. Most current optical wireless products in the market are only physical layer devices and can be a good alternative for coax cable. Optical wireless device can be integrated into Femtocell device easily with current chip design technology. Protocol stack designs for Femtocell-Optical device and Mesh-Optical device are respectively shown in FIGS. 5 and 6. The protocol stack function can be fulfilled by one or more chips in real Femtocell-Optical and Mesh-Optical product. F-BS with integrated optical interface scheme could work well when MRs and F-BSs are both in the outdoor environment or wide indoor area such as shopping mall centers or airport.

Figure 4:
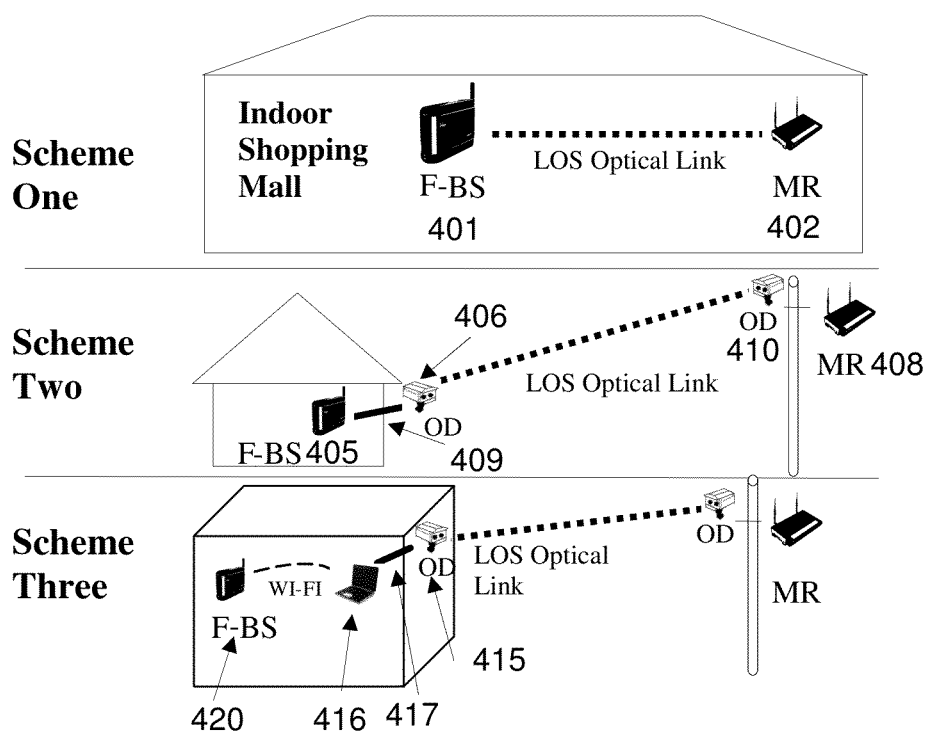
FIG. 4 is an illustration of various exemplary Femtocell-Optical-Mesh interconnection schemes according to the present invention.

According to another aspect of the present invention, with reference to Scheme Two in FIG. 4, F-BS (405) with an external optical device (406) acts as a bridge to mesh router in the mesh network. Existing optical product in the market can work as external device connected to F-BS with multiple interfaces, such as a serial port RS232 and Ethernet port. Also, current optical device can work well behind the window; therefore, as long as optical device is mounted nearby the windows, optical link can connect F-BSs and MRs. In order to establish a link between F-BS and MRs in a mesh network, a mesh router with an integrated optical device (not shown) or a mesh router (408) that is connected to an external optical device (410) needs to be able to communicate with F-BS' optical interface (406) via LOS optical link. F-BS with external optical device (OD) scheme is suitable for line-of-sight requirement even when F-BSs and MRs's positions are not in LOS.

As shown in FIG. 4 Scheme Two, F-BS (405) could be connected to optical device (406) via RS232 cable or Ethernet cable (409). Similar connection can be used between optical device (410) and MR (408). Optical transceiver for such purpose is available in the market, such as LightPointe Corporation's AIRELITE 100 product, which uses Ethernet interface.

When F-BS is too difficult to reach to an optical device by a series port cable or an Ethernet cable, a computer-aided scheme can still work for Light-of-sight purpose. According to another aspect of the invention, with reference to Scheme Three of FIG. 4, F-BS with computer-aided optical device is used. Optical transceiver (415) can be connected via RS232 cable (417) to a computing device (416) with a 802.11 wireless adapter, in order to communicate with a Femtocell base station integrated with Wi-Fi function (420). Femtocell device with integrated Wi-Fi function is a current 3-G Femtocell product trend, which can reduce hardware cost. Wi-Fi wireless link and computer could work as a bridge between F-BS and optical transceiver, making F-BS and optical device connection more flexible.

The hardware cost would increase from scheme 1 to scheme 3, but, at the same time, the limitations of installation drop dramatically. FIG. 4 shows three exemplary schemes from hardware aspect, however, from the software aspect; all three schemes have similar protocol stacks shown in FIG. 5 and FIG. 6.

Figure 5:
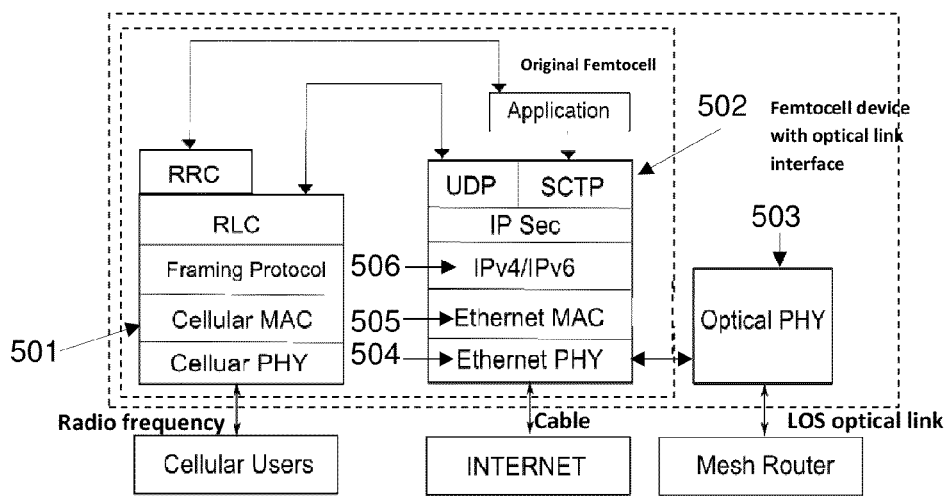
FIG. 5 is an exemplary Femtocell-optical protocol stack according to the present invention.

With further reference to FIG. 5, block 501 is a cellular standard protocol stack and block 502 is an Ethernet protocol for routing function with some Femtocell modification, and block 503 is a wireless optical stack. The two blocks 501 and 502 are existing stacks for current 3-G Femtocell device in the market and more details can be referred to 3GPP, 3GPP2, WIMAX Femtocell specification document. Optical transceiver could receive data via Optical PHY layer from mesh router side and send data to Ethernet PHY layer (504). According to one aspect of the present invention, a routing function module is be added into a Femtocell. PHY layer (504) would forward data up to Ethernet network IP layer (506). The IP layer can send data through Ethernet MAC layer (505) and Ethernet PHY layer (504), and in turn data would be pushed sent out to Internet. In this procedure, three lower layers Ethernet PHY layer (504), Ethernet MAC layer (505) and Ethernet network IP layer (506) work as a regular network router. The data from Internet side will go through opposite direction and are sent out via laser beam by optical transceiver.

Mesh-Optical Link

Figure 6:
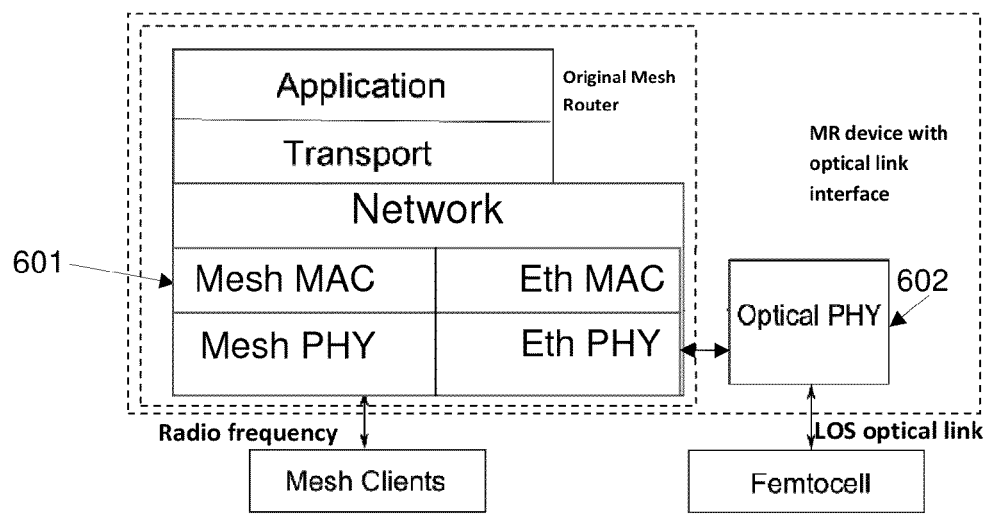
FIG. 6 is an exemplary Mesh-optical protocol stack following the present invention.

Similar to Femtocell-Optical, optical transceiver can also work with mesh router. FIG. 6 is an integrated mesh-optical protocol stacks diagram. Block 601 represents an existing Mesh Router protocol stack design and the block 602 indicates optical physical layer. Eth MAC and PHY layer in block 601 are referred to 802.3 standard Ethernet protocol. And mesh MAC and mesh PHY are referred to any 3G&4G wireless technique standard. Mesh router's Eth PHY layer communicates with optical PHY layer and bring data up to Network layer or Application layer, which depends on MR functions. Next step, Application layer or Network layer would send data through mesh MAC layer and mesh PHY layer to mesh clients. In the same principle to Femtocell-optical device, this stack design can be achieved easily in chip design area.

Figure 7:
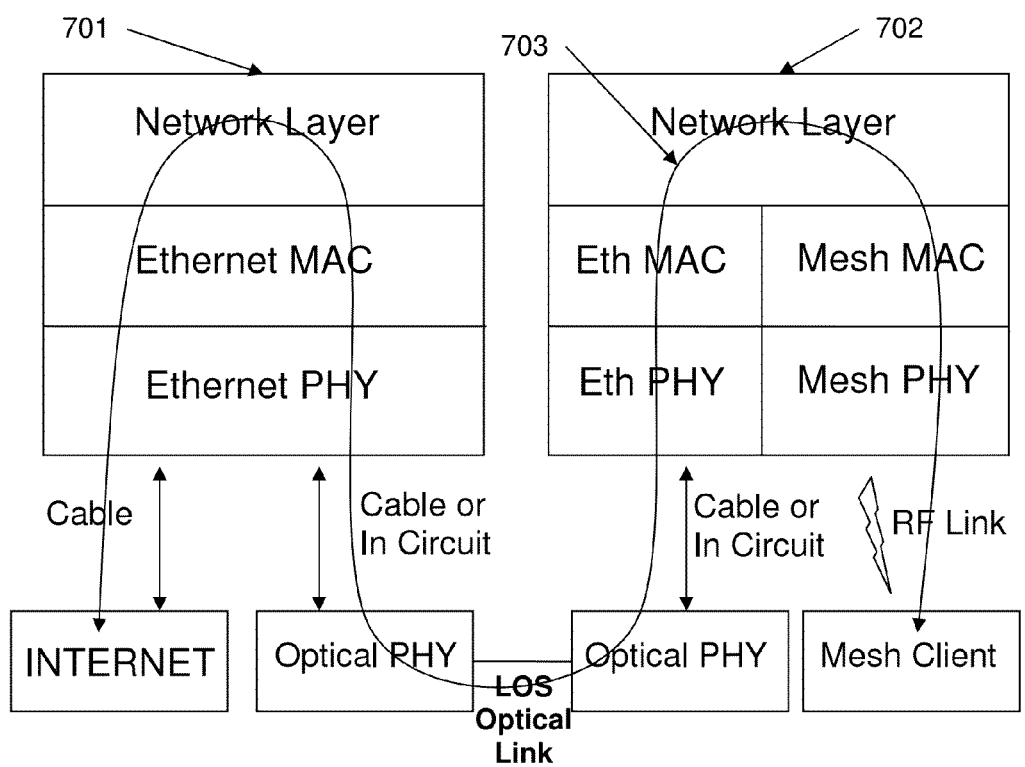
FIG. 7 is an exemplary dataflow in a mesh network according to the present invention.

The devices shown in FIGS. 5 and 6 can communicate with each other via an LOS optical link, while they could serve their users with radio frequency separately and sharing a single cable for data towards Internet. An example data flow is shown in FIG. 7. Block 701 is the lower three layers of F-BS protocol stack, also acting as a network router. Block 702 is the lower three layers of MR protocol stack. The curve 703 shows typical data flows over all relevant protocol stacks. Once a MR receives data from a MC through mesh physical layer, it could bring data up to its Network layer. Without the presence of Femtocell, mesh router would use multi-hop technique to forward data to nearest IGW. According to one aspect of the present invention, the mesh router's Ethernet PHY layer will exchange information with optical device and data will be emitted by LOS optical link to a nearby F-BS's optical interface. Data will go to Internet through existing 3-G Femtocell backhaul Internet link in one-hop optical link, instead of original multi-hop radio frequency link to an existing IGW.

Deployment Strategies

4-G WMN design is a fundamental issue in deciding the network efficiency such as throughput and cost. Higher throughput can be easily achieved by deploying more IGWs or connecting more MRs to F-BS with optical link in the network. However, at the same time, major cost of WMN is from monthly Internet connection fee of IGWs or share fee from F-BS. To design a cost-effective WMN, we need to find a balance point between higher throughput and lower cost. Therefore, it is crucial to minimize the number of IGWs or wireless optical connections for satisfying system throughput requirement.

As mentioned before, IGWs can be achieved by connecting MRs to wired Internet or F-BS. Now if we connect MRs to 3-G Femtocells, several basic requirements should be considered in practical aspects for selecting a F-BS near-by for candidate MRs.

1) Line-of-Sight: To establish optical wireless connection, MRO (302) and F-BS (303), with reference to FIG. 3, must be in light-of-sight manner. Check candidate MR around for available line-of-sight F-BS at first, otherwise MR can only be connected to wired Internet as a new IGW.

2) Bandwidth: Field surveys need to be finished by manpower before system deployment to build a list of neighborhood 3-G Femtocell bandwidth. For a particular Mesh Router (MR), there is a set of F-BS(s) in its neighborhood that are listed based on their bandwidth having the highest bandwidth Femtocell at the top of the list. Depending on its availability, the optical device vendors can select which F-BS(s) in this list that can make the connection, starting from the top most candidate. Hence, the F-BS(s) on the top of 3-G Femtocell backhaul bandwidth list are selected if the MR has the capability of making more than one connection. Having such bandwidth can guarantee QoS for the system.

3) User density: Least user density is the first choice among several optional F-BSs. Few users at a 3-G Femtocell mean more available backhaul bandwidth for a WMN.

In order to route the packets through the Femtocells, the end users need to get subscription from the 3-G Femtocell operator(s) which will incur additional cost. If the mesh network aims to provide Internet for an affordable price or at a very low cost, the cost of the newly formed network with connectivity to a Femtocell has to be kept minimum to keep in line with the goals of the original mesh network.

According to one aspect of the present invention, the following constraints are considered in the MR routing algorithm so that the capacity of the network is increased while keeping the total cost at a minimum.

1) Any MR can be connected to a 3-G Femtocell (if such a Femtocell exists in the range) so that any MRs in the original mesh network will have a connection to a gateway (either IGW or Femtocell) within maximum of R-hops. This constraint will ensure that the capacity of the network can be kept at a certain threshold so as to support more VoIP calls or other data services with acceptable QoS. This will allow us to guarantee QoS to the end user of the service (such as video frames) on the WMN.

2) The above constraint of any MR having connectivity to a gateway within the maximum of R-hops should be achieved by using the minimum number of 3-G Femtocells. This constraint to ensure the cost of the network be kept minimum by adding just few 3-G Femtocells to the MRs while conforming to the first constraint.

3) We assume that only one connection can be made between a given Femtocell and a MR. But, with the advancement of Femtocells, this constraint can be relaxed if Multi-input Multi-output Femtocell technique is developed well. This constraint will allow us to simplify the design of the Femto Access Points which can possibly be relaxed in the future with the advancement of Femtocell technology.

Femtocell-Based WMN Deployment

Figure 8:
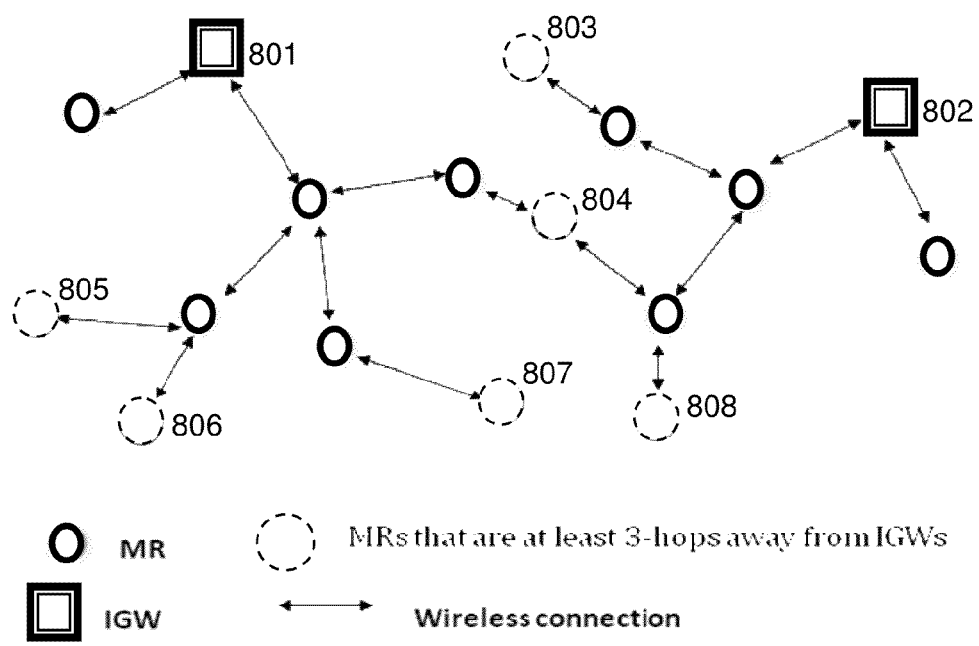
FIG. 8 is an illustration of bidirectional connectivity of MRs and IGWs.

Consider a large existing community WMN that provides Internet connectivity to end users. If the end users are R-hop apart from an IGW, the number of calls end users can make with acceptable QoS degrades heavily. For example, with reference to FIG. 8, MRs and IGWs are all connected bi-directionally, and MRs 803-808 are all at least 3-hops away from their respective IGWs (801 or 802). In this community, there are Open Access Femtocells that are available and the locations of these Open Access Femtocells are known and their placement strategy is random.

When a new WMN is deployed in some specific region, the first design phase is the coverage of the network. Only MRs need to be considered in this phase without considering any F-BSs, and IGWs can be deployed by connecting certain candidate MRs to the wired Internet. Hop distance is defined as the number of intermediate hops between any two nodes. In R-hop distance, we basically keep this intermediate hop distance to take a certain value of R. The value of R is based on the required quality of service. As most houses will have Femtocells in the near future, finding a Femtocell is trivial. The main issue is which Femtocell is best suited from line-of-sight point of view in creating a new IGW through the Internet connection of a Femtocell.

The principle for choosing candidate MRs, for use as IGWs, is the same as optimizing IGW deployment in WMN without 3-G Femtocell. Therefore, two exemplary effective heuristic algorithms can be adapted from Bing He, Bin Xie, and Dharma P. Agrawal, "Optimizing the Internet Gateway Deployment in a Wireless Mesh Network" Proc. Mobile Ad hoc and Sensor Systems, 2007(MASS 2007) IEEE International Conference for the purpose of minimizing the number of IGW deployment. By way of incorporation, a WMN is represented by a R-hop connecting graph $G_R$, in which two nodes are regarded as neighbors if they are within the R-hop range or distance. A range or distance is regarded as the least number of hops a network node needs to reach any available Internet gateways on the network. R-hop degree of a network node is defined as the total number of other nodes connected within R-hop (i.e. from 1-hop to R-hop). The higher the degree for a node is, the more MRs the node is connected within R-hop range. The R-hop weight of a network node is defined as following:

$$W(v_i, R) = \sum_{\forall v_j \in N_R(v_i)} 1/Hop(v_i, v_j),$$

where $Hop(v_i, v_j)$ is the shortest hop between node $v_i$ and node $v_j$; $N_R(v_i)$ is the set of nodes that are neighbors of $v_i$ in $G_R$; W is the weight and $G_R$ is the connecting graph created using R-hop distances. As an example, if the value of R is equals to 5 then in the resulting graph $G_5$, any two neighboring nodes can be connected by 5 hops or less.

One exemplary heuristic algorithm for finding candidate MR is based on calculating the R-hop degree of the MRs in a given mesh network. According to one aspect of the invention, all MRs in the network will be placed in a priority list in the order of their R-hop degree with the top one being of highest R-hop degree. The first MR in the priority list is most likely to be chosen to connect to the Internet (forming of IGWs). In order to minimize the time and space complexity of the heuristic algorithm, according to one aspect of the present invention, at first only the MRs that are not currently within a specified R-hop distance from any IGWs are selected for the calculation of R-hop degree.

According to another aspect of the invention, the heuristic algorithm for finding candidate MR uses R-hop weight as the selection parameter, for which the MR capacity is also considered in establishing a network. All MRs are placed in a priority list in the order of their R-hop weights with the top one being of highest R-hop weight. The top first MR in the priority list is most likely to be chosen to connect to the Internet.

A similar strategy can be used to preselect MRs to be included for the calculation of R-hop weights based on R-hop distance in order to minimize time and space complexity.

The 3-G Femtocell based deployment strategy thus comprises two steps. The first step is to ignore the presence of Femtocells completely and run aforementioned heuristic algorithm(s) in an attempt to select candidate MRs to act as future IGWs. Selected candidate MRs, obtained from the heuristics could be multiple hops away from the nearest IGW. The second step is to check the available Open access 3-G Femtocells around these selected MRs and connect them with Open access 3-G Femtocells to convert these MRs to act as IGWs. If there are more than one Open access Femtocells available around a selected MR then two exemplary methods can be used to maximize the overall performance. In one exemplary method, a MR can be randomly connected to any Femtocell nearby. In another exemplary method the Femtocells can be prioritized based on their bandwidth, availability, cost etc and the MR can decide which Femtocells to be connected that can be based on this priority list.

To further describe this scenario, according to one aspect of the invention, a mathematical model based on Markov chains can be used and the final outcome is based on branch and bound algorithm. Most of the above statistical information can be collected by respective network service providers, wireless carriers etc. As an example, one way to form this priority list can be described as follows. The factors such as bandwidth, availability, and cost can be represented by using a certain weight and summing up these individual weights for a Femtocells, the overall weight of it can be calculated. To calculate individual weights reflecting their actual values can be based on a proportional scale. For an example weights to bandwidth on a scale of 1 to 10 can be assigned reflecting the bandwidths from 1 Mbps to 50 Mbps. Based on these overall weights the priority list can be calculated.

Once a particular MR is decided to connect to a Femtocell, a one time manual process is needed to set up the Optical Wireless transmitters and related equipments and those need to be done by optics device vendors. These bi-directional Optical Wireless Communication links are used between MRs and Open Access Femtocells for the communication. After setting up the related equipments, the optical device switching on and off can be done automatically by systems according to the traffic pattern, but at first the initial set up needs to be done by someone manually.

Figure 9:
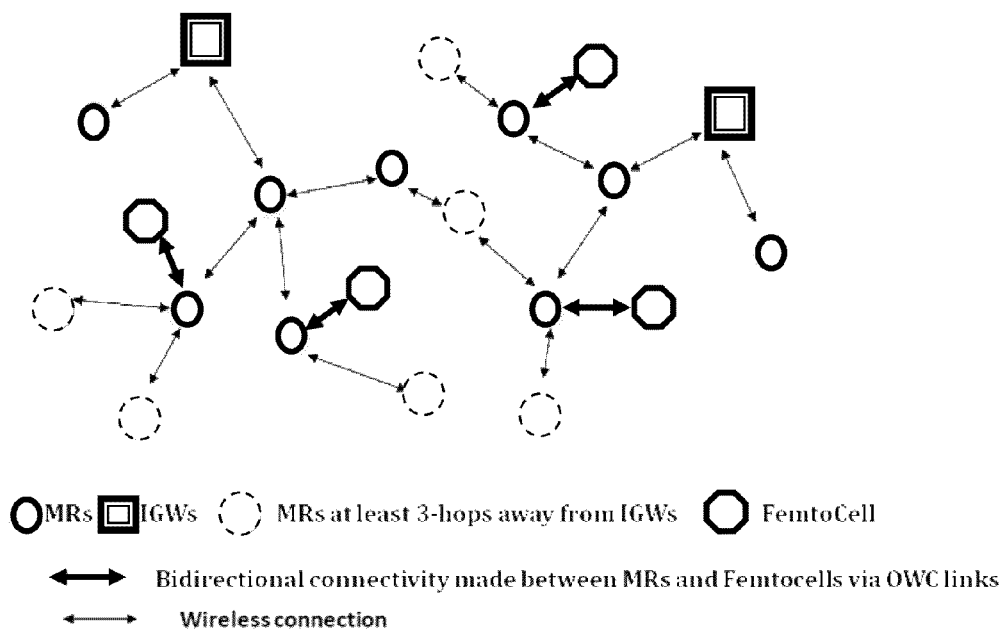
FIG. 9 is an exemplary 3-G Femtocell connection to the existing Wireless Mesh Network.

Each MR can decide whether to forward the packets to an existing far away IGWs or to a newly connected 3-G Femtocell (new IGW based on a Femtocell). In the given exemplary scenario as illustrated in FIG. 9, by forwarding the packets through Femtocells, any MR can be connected to a gateway (either an IGW or a Femtocell) within maximum of 2-hops. This process of adding a new IGW through a Femtocell and selecting an appropriate IGW can be easily automated by adding a few lines of software code.

The description of the invention is merely exemplary in nature and, thus, variations of the above disclosed embodiments can also be made to accomplish the same functions. For example, the computing device (416) in Scheme Three of FIG. 4 could be an off the shelf desktop computer, laptop or a special purpose microprocessor controller.

In yet another embodiment according to the present invention, the computing device (416) could also be built into optical device (415) with Wi-Fi capability, eliminating the need for a separate computer. Still further, the communication link between F-BS (420) and computing device (416) could also be other links e.g. Bluetooth or other RF links, instead of Wi-Fi.

Still further, Open Access Femtocells were described for simplicity and illustrative purposes. The present invention is also applicable to Closed Access Femtocells or Hybrid Femtocells, in which scenarios network access provisioning needs to be incorporated.

Still further, the spirit of the present invention could be applicable to any network which consists of routers with Internet Gateway nodes that provides wireless Internet to anyone.

Still further, with WMN and Femtocells, even though we use 3-G Femtocells to increase the total bandwidth of the network as described, the present invention can also use any other device that can be connected through Wireless Fiber Optics to the Mesh Routers to increase the capacity.

Still further variations, including combinations and/or alternative implementations, of the embodiments described herein can be readily obtained by one skilled in the art without burdensome and/or undue experimentation. Such variations are not to be regarded as a departure from the spirit and scope of the invention.

What is claimed is:

1. A wireless RF mesh network system comprising:
a plurality of RF mesh routers, at least one of said plurality of mesh routers having a wireless optical interface;
a first Internet gateway residing in said wireless RF mesh network for providing Internet backhaul; and
an assigning module for dynamically assigning said at least one of the plurality of mesh routers having wireless optical interface to act as a second Internet gateway through a line-of-sight link to a base station residing in a network different from said wireless RF mesh network.

2. The system of claim 1, wherein said base station is a Femtocell base station and the assigning module is operable to select at least one of the plurality of mesh routers to act as the second Internet gateway based on the distance of said plurality of mesh routers to the base station.

3. The system of claim 1, wherein said assigning module is operable to select one or more candidate mesh routers based on a sorted list of R-hop metric values of said plurality of routers without considering the presence of the base station, and among said selected candidate mesh routers, to select said at least one mesh router acting as the second Internet gateway to connect to said base station based on the distance of said candidate mesh routers relative to said base station.

4. The system of claim 3, wherein said R-hop metric is a R-hop degree based on the total number of other nodes connected within R-hop distance.

5. The system of claim 3, wherein said R-hop metric is a R-hop weight based on R-hop degree and network capacity of each respective mesh router.

6. The system of claim 5, wherein said R-hop weight is based on:

$$W(v_i, R) = \sum_{\forall v_j \in N_R(v_i)} 1/Hop(v_i, v_j).$$

where $Hop(v_i, v_j)$ is the shortest hop between node $v_i$ and node $v_j$; $N_R(v_i)$ is the set of nodes that are neighbors of $v_i$ in $G_R$; W is the weight and $G_R$ is the connecting graph created using R-hop distances.

7. The system of claim 3, wherein said assigning module is operable to preselect candidate mesh routers such that said preselected candidate mesh routers are no less than a certain number of R-hop distance; and said assigning module is operable to select said one or more candidate mesh routers only based on said preselected candidate mesh routers.

8. In a wireless RF mesh network including a plurality of RF mesh routers, at least one of said plurality of mesh routers having a wireless optical interface, at least one first Internet gateway residing in said wireless RF mesh network for providing Internet backhaul, a method comprising the steps of:
selecting one or more candidate routers from one or more of said plurality of mesh routers; and
assigning dynamically at least one of said selected candidate mesh routers to act as a second Internet gateway through a line-of-sight link to a base station residing in a network different from said wireless RF mesh network.

9. The method of claim 8, wherein said base station is a Femtocell base station.

10. The method of claim 9, wherein said assigning step further uses a mathematical model based on Markov chains to create a priority list corresponding to a plurality of candidate Femtocell base stations residing in said network different from said wireless RF mesh network.

11. The method of claim 8, wherein said assigning step further comprising the steps of:
- selecting one or more candidate mesh routers based on a sorted list of R-hop metric values of said plurality of mesh routers without considering the presence of the base station; and
- selecting among said one or more candidate mesh routers said at least one mesh router acting as the second Internet gateway to connect to said base station based on the distance of said one or more candidate routers relative to said base station.

12. The method of claim 11, wherein said R-hop metric is a R-hop degree total number of other nodes connected within R-hop distance.

13. The method of claim 11, wherein said R-hop metric is a R-hop weight based on R-hop degree and network capacity of respective mesh router.

14. A Femtocell network system comprising:
- at least one Femtocell base station having Internet backhaul and connecting to a wireless optical device; and
- a connecting module adapted for (1) dynamically connecting said Femtocell base via a line-of-sight link to at least one of a plurality of RF mesh routers residing in a wireless RF mesh network different from said Femtocell network, and (2) upon receiving request from said RF mesh router providing Internet connection to said wireless RF mesh network.

15. The system of claim 14, wherein said wireless optical device is connected to said Femtocell base station as built-in optical interface.

16. The system of claim 14, wherein said wireless optical device is connected to said Femtocell base station externally via at least one of wired connection and wireless connection.

17. The system of claim 14, wherein said wireless optical device is connected to said Femtocell base station externally via a computer.

18. The system of claim 14, wherein said connecting module is adapted to transmit to said at least one of connected RF mesh routers information about said Femtocell base station, said information comprising at least one of bandwidth, availability and cost.

* * * * *